US012603386B2

(12) United States Patent
Li et al.

(10) Patent No.: US 12,603,386 B2
(45) Date of Patent: Apr. 14, 2026

(54) BATTERY CELL, BATTERY, AND ELECTRIC DEVICE

(71) Applicant: CONTEMPORARY AMPEREX TECHNOLOGY CO., LIMITED, Ningde (CN)

(72) Inventors: Chuan Li, Ningde (CN); Zhijun Guo, Ningde (CN); Yuyong Lei, Ningde (CN); Han Yan, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/299,349

(22) Filed: Aug. 14, 2025

(65) Prior Publication Data

US 2025/0372808 A1    Dec. 4, 2025

Related U.S. Application Data

(63) Continuation of application No. PCT/CN2023/136688, filed on Dec. 6, 2023.

(30) Foreign Application Priority Data

Jun. 29, 2023    (CN) .......................... 202310784350.0

(51) Int. Cl.
*H01M 50/375* (2021.01)
*H01M 50/342* (2021.01)
(52) U.S. Cl.
CPC ..... *H01M 50/375* (2021.01); *H01M 50/3425* (2021.01); *H01M 2200/10* (2013.01); *H01M 2200/20* (2013.01)

(58) Field of Classification Search
CPC .......... H01M 50/375; H01M 50/3425; H01M 2200/10; H01M 2200/20
See application file for complete search history.

(56) References Cited

U.S. PATENT DOCUMENTS

| | | | | |
|---|---|---|---|---|
| 2021/0036285 A1* | 2/2021 | Huang | ................ | H01M 50/159 |
| 2021/0359372 A1* | 11/2021 | Wu | ..................... | H01M 50/148 |

(Continued)

FOREIGN PATENT DOCUMENTS

| | | | |
|---|---|---|---|
| CN | 112331992 A | 2/2021 |
| CN | 112736363 A | 4/2021 |

(Continued)

OTHER PUBLICATIONS

The International Search Report received in the International Application No. PCT/CN2023/136688, dated Mar. 4, 2024, 4 pages with English translation.

*Primary Examiner* — Tong Guo
*Assistant Examiner* — Albert Michael Hilton
(74) *Attorney, Agent, or Firm* — K&L Gates LLP

(57) ABSTRACT

The present application provides a battery cell, a battery, and an electric device. The battery cell includes a housing, a pressure relief mechanism, and a protective member. The housing includes a wall portion. The pressure relief mechanism is provided at the wall portion, and can be actuated to release gas within the housing in a case where an internal pressure or temperature of the battery cell reaches a threshold value. The protective member has a melting point greater than or equal to 300° C., and the protective member covers at least part of the pressure relief mechanism in a thickness direction of the wall portion.

18 Claims, 8 Drawing Sheets

6

(56)         References Cited

U.S. PATENT DOCUMENTS

2022/0185124 A1 *   6/2022   Kruse  ................. H01M 50/209
2022/0320677 A1 *  10/2022   Guo  ................... H01M 50/164
2024/0297405 A1 *   9/2024   Deng  ............... H01M 50/3425

FOREIGN PATENT DOCUMENTS

CN        216251004 U      4/2022
CN        216698634 U   *   6/2022   ........ H01M 50/3425
CN        216872178 U      7/2022
CN        115398721 A     11/2022
CN        115668613 A      1/2023
CN        115699437 A      2/2023
WO        2022109884 A1    6/2022

* cited by examiner

2

2

BATTERY CELL, BATTERY, AND ELECTRIC DEVICE

CROSS-REFERENCE TO RELATED APPLICATIONS

The present application is a continuation of International Application No. PCT/CN2023/136688, filed on Dec. 6, 2023, which claims priority to Chinese Patent Application No. 202310784350.0, filed on Mar. 6, 2023 and entitled "Battery Cell, Battery, and Electric device", which is incorporated herein by reference in its entirety.

TECHNICAL FIELD

The present application relates to the field of batteries, and in particular, to a battery cell, a battery, and an electric device.

BACKGROUND

With the development of battery technologies, a battery cell is used in more and more fields, gradually replacing traditional fossil energy sources in the automotive power field. The battery cell may store chemical energy and controllably convert it into electrical energy. A battery cell that can be reused may continue to be used after discharging by activating active materials therein by charging.

For the battery cell, how to increase its reliability is an important research field in the industry.

SUMMARY

The present application provides a battery cell, a battery, and a power device, and can increase the reliability of the battery cell.

In a first aspect, the present application provides a battery cell including a housing, a pressure relief mechanism, and a protective member. The housing includes a wall portion. The pressure relief mechanism is provided at the wall portion, and can be actuated to release gas within the housing in a case where an internal pressure or temperature of the battery cell reaches a threshold value. The protective member has a melting point greater than or equal to 300° C., and the protective member covers at least part of the pressure relief mechanism in a thickness direction of the wall portion.

When the battery cell is subjected to thermal runaway, the pressure relief mechanism is actuated to release the gas within the housing, so as to reduce risks of explosion and ignition of the battery cell to increase its reliability. The protective member can isolate external impurities to reduce corrosion or damage to the pressure relief mechanism by the impurities, increasing reliability of the pressure relief mechanism. The protective member has a melting point greater than or equal to 300° C. and can withstand relatively strong thermal shock. In a case where a high-temperature material flows through the battery cell, the protective member can withstand the thermal shock of the high-temperature material and is less likely to have problems such as deformation, melting through, etc., so that the pressure relief mechanism is isolated from at least a part of the high-temperature material to reduce a heat amount transferred to the mechanism, reducing a cracking failure risk of the pressure relief mechanism, and increasing reliability of the battery cell.

In some embodiments, the wall portion has an outer surface, and is provided with an accommodating recess recessed with respect to the outer surface. At least a part of the protective member is accommodated in the accommodating recess.

By providing the accommodating recess and providing at least a part of the protective member in the accommodating recess, it is possible to reduce the space occupied by the battery cell in the thickness direction, increasing the space utilization rate and energy density of the battery cell.

In some embodiments, the protective member is completely accommodated in the accommodating recess.

The embodiment of the present application may further increase the space utilization rate and energy density of the battery cell. In addition, the protective member completely accommodated in the accommodating recess can reduce a risk of friction between the protective member and an external structure in a process for producing, transporting, or using the battery cell, to increase the reliability of the protective member.

In some embodiments, a bottom wall of the accommodating recess is provided with a through hole, and the pressure relief mechanism is accommodated in the accommodating recess, is connected to the bottom wall, and covers the through hole. The protective member and the pressure relief mechanism are provided at intervals in the thickness direction. The embodiments of the present application may reduce a heat transfer rate between the protective member and the pressure relief mechanism to reduce a temperature rise of the pressure relief mechanism when the protective member is thermally shocked by a high-temperature material, reducing a cracking failure risk of the pressure relief mechanism.

In some embodiments, there is no other component between the protective member and the pressure releasing mechanism in the thickness direction.

A heat-insulation chamber is formed between the protective member and the pressure relief mechanism to reduce the heat transfer rate between the protective member and the pressure relief mechanism. No other physical component between the protective member and the pressure relief mechanism may both reduce blocking to gas when the pressure relief mechanism is actuated, and, to some extent, prevent heat conducting of the physical structure between the protective member and the pressure relief mechanism, reducing the heat transfer rate between the protective member and the pressure relief mechanism.

In some embodiments, in the thickness direction, a minimum spacing between the protective member and the pressure relief mechanism is D, and a minimum thickness of the protective member is t. D and t satisfy $t \times D \geq 0.01$ mm².

The larger the t is, the lower the temperature of the surface of the protective member facing the pressure relief mechanism is, and the less the amount of heat irritated by the protective member towards the pressure relief mechanism is when a high-temperature material impacts the protective member. The smaller the t is, the higher the temperature of the surface of the protective member facing the pressure relief mechanism is, and the more the amount of heat irritated by the protective member towards the pressure relief mechanism is when a high-temperature material impacts the protective member. The larger the D is, the longer the heat transfer path between the protective member and the pressure relief mechanism is, and the smaller the D is, the shorter the heat transfer path between the protective member and the pressure relief mechanism is when the high-temperature material impacts the protective member.

In the embodiments of the present application, $t \times D$ is defined to be greater than or equal to 0.01 mm², so that a temperature rise of the pressure relief mechanism can be reduced when the high-temperature material impacts the protective member, reducing a cracking failure risk of the pressure relief mechanism.

In some embodiments, t is 0.05 mm-0.4 mm. By defining t being greater than or equal to 0.05 mm, it is possible to reduce the amount of heat radiated from the protective member to the pressure relief mechanism when the high-temperature material impacts the protective member, reducing a temperature rise of the pressure relief mechanism. The larger the t is, the large the space occupied by and the weight of the protective member are; and by defining t being greater than or equal to 0.05 mm, it is possible to reduce the space occupied by and the weight of the protective member provided that the protection requirement of the protective member is satisfied, increasing the energy density of the battery cell.

In some embodiments, t is 0.05 mm-0.2 mm to reduce the space occupied by and the weight of the protective member provided that the protection requirement of the protective member is satisfied, increasing the energy density of the battery cell.

In some embodiments, the battery cell further includes a connection layer by which the protective member is connected to the wall portion. The connection layer may be actuated in a case where an internal pressure or temperature of the battery cell reaches a threshold value, so as to disengage at least a part of the protective member from the wall portion.

In a case where an internal pressure or temperature of the battery cell reaches a threshold value, the pressure relief mechanism is actuated to release gas within the housing, and at least a part of the protective member is disengaged from the wall portion under other internal action, thereby draining gas inside the battery cell to reduce its internal pressure and temperature.

In some embodiments, the connection layer includes an adhesive layer.

When the battery cell has thermal runaway, heat may be conducted to the connection layer, and it softens, so that the protective member can be disengaged from the wall portion in time when the pressure relief mechanism is actuated.

In some embodiments, the connection layer is provided at an outer peripheral region of a surface of the protective member facing the pressure relief mechanism. By providing the connection layer at an outer peripheral region of the protective member, it is possible to reduce the material amount for the connection layer and a risk of connecting the connection layer to the pressure relief mechanism.

In some embodiments, an avoidance space is formed between the protective member and the pressure relief mechanism, a communication flow path is provided between the protective member and the wall portion, one end of the communication flow path communicates with the outside, and the other end thereof communicates with the avoidance space.

During charge and discharge of the battery cell, the internal gas pressure of the battery cell slightly fluctuates. When the internal gas pressure of the battery cell fluctuates, the pressure relief mechanism may bulge outward. In the embodiment of the present application, by providing the communication flow path and allowing the avoidance space to communicate with the external environment, a gas pressure change in the avoidance space is reduced when the pressure relief mechanism bulges, reducing the deformation of the protective member. In addition, in a process of producing a battery cell, the airtightness at the pressure relief mechanism may be detected by the communication flow path and avoidance space.

In some embodiments, the communication flow path includes a groove provided in a surface of the protective member facing the pressure relief mechanism. By providing the groove in the surface of the pressure relief mechanism, the avoidance space is communicated with the external environment out of the battery cell.

In some embodiments, the protective member has a melting point greater than or equal to 500° C. The protective member, having a relatively high melting point, is less likely to melt when it is subjected to thermal shock, thereby enabling better thermal shock resistance of the protective member to reduce a melted-through risk of the protective member.

In some embodiments, a material for the protective member includes one of mica, rubber, ceramic, or polyimide. These materials have relatively good thermal shock resistance, thereby providing protection to the pressure relief mechanism to reduce a failure cracking risk of the pressure relief mechanism.

In some embodiments, the material of the protective member includes polyimide, and the protective member has a tensile strength of 100 MPa-350 MPa at 150° C.

The greater the tensile strength of the protective member is, the higher the difficulty that it is broken when the pressure relief mechanism is actuated. The embodiment of the present application sets the tensile strength of the protective member at 150° C. less than or equal to 350 MPa, so the protective member can be broken in time when the pressure relief mechanism is actuated, increasing gas discharging efficiency.

The smaller the tensile strength of the protective member is, the larger the deformation of the protective member is when external air pressure fluctuates, and the easier the fatigue deformation of protective member is as use time increases. The embodiment of the present application sets the tensile strength of the protective member greater than or equal to 100 MPa at 150° C., so it is possible to slow aging of the protective member, extending the service life of the battery cell.

In some embodiments, the battery cell may also include an electrode assembly accommodated in the housing. A thickness direction of the wall portion is parallel to a gravity direction, and the wall portion is located at a lower side of the electrode assembly in the gravity direction. The wall portion may provide support for the electrode assembly to increase its stability. When the battery cell has thermal runaway, gas may be injected downward, thereby reducing gas discharging resistance to increase gas discharging efficiency.

In some embodiments, the housing comprises a case which has an opening at an end and an end cap which is connected to the housing and covers the opening; and the housing includes the wall portion opposite to the end cap. Providing the pressure relief mechanism on the case can prepare more installation space for components on the end cap.

In a second aspect, an embodiment of the present application provides a battery including the battery cell in any one of the plurality of embodiments of the first aspect.

In some embodiments, the battery further includes a box within which a plurality of battery cells are accommodated. The box includes a first box wall, and a wall portion is provided at an end of the housing facing the first box wall. An inner side of the first box wall is provided with a channel;

and a projection of the pressure relief mechanism of the plurality of battery cells is located within a projection of the channel in the thickness direction. In the thickness direction, the protective member is located between the channel and the pressure relief mechanism.

When the battery cell is subjected to thermal runaway, the pressure relief mechanism is actuated to release gas in the housing outward into the channel; and the channel guides flowing of the high-temperature gas to discharge it out of the box, reducing an explosion risk of a battery. In a process of flowing high-temperature gas in the channel, the protective member can isolate the high-temperature gas from the pressure relief mechanism to reduce the amount of heat conducted to the pressure relief mechanism to reduce its cracking failure risk, so that persistent deterioration of thermal runaway is mitigated to increase reliability of a battery.

In some embodiments, in the thickness direction, a projection of the protective member is located within a projection of the channel.

When the pressure relief mechanism is actuated, the protective member may enter the channel to drain gas within the housing; and the embodiments of the present application may reduce the risk that the first box wall interferes with the protective member, allowing the protective member to smoothly enter the channel.

In some embodiments, the channel has a size larger than that of the protective member in any direction perpendicular to the thickness direction.

The embodiments of the present application may eliminate the problem that the first box wall interferes with the protective member due to an assembly error, so that the protective member may smoothly enter the channel when the battery cell has thermal runaway.

In a third aspect, the present application provides an electric device including the battery according to any one of the embodiments in the first aspect, and the battery is used to provide electric energy.

DESCRIPTION OF DRAWINGS

The feature, advantage, and technical effect of the exemplary embodiment of the present application is described below with reference to the figures.

Figure 1:
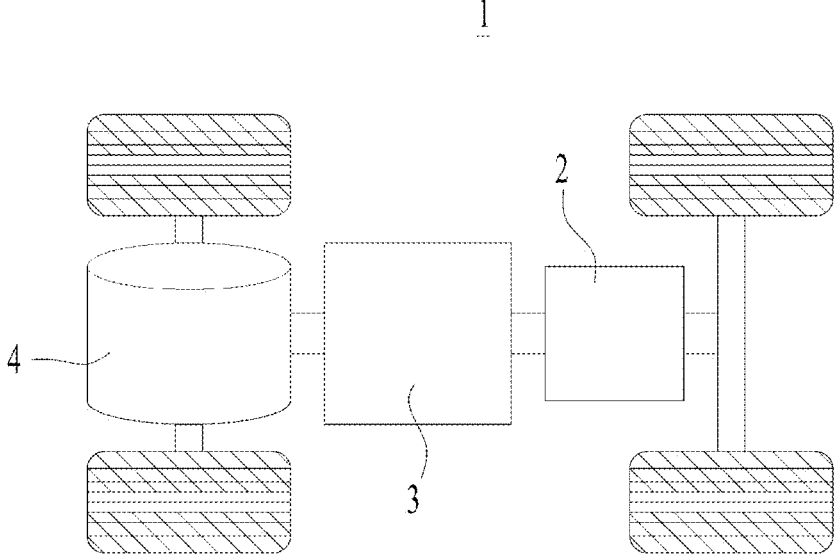
FIG. 1 is a schematic structural diagram of a vehicle according to some embodiments of the present application.

The figures are not necessarily drawn to the actual scale.

DESCRIPTION OF EMBODIMENTS

To make the objectives, technical solutions, and advantages of embodiments of the present application clearer, the following clearly describes the technical solutions in embodiments of the present application with reference to the accompanying drawings in the embodiments of the present application. Clearly, the described embodiments are some but not all of the embodiments of the present application. All other embodiments obtained by a person of ordinary skill in the art based on the embodiments of the present application without making creative efforts shall fall within the protection scope of the present application.

Unless otherwise defined, all technical and scientific terms used in the present application have the same meaning as commonly understood by a person skilled in the art of the present application. In the present application, the terms used in the specification of the present application are used only for the purpose of describing specific embodiments and are not intended to limit the present application, and the terms "comprise", "have", and any variations thereof in the specification and claims of the present application and the foregoing description of the drawings are intended to cover a non-exclusive inclusion. The terms "first", "second", and the like in the specification and claims of the present application or in the accompanying drawings are used to distinguish between different objects, and are not used to describe a specific sequence or a primary-secondary relationship.

An "embodiment" in the present application means that a specific feature, structure, or characteristic described with reference to the embodiment may be included in at least one embodiment of the present application. The phrase in various places in the description does not necessarily all refer to the same embodiment, or a separate or alternative embodiment mutually exclusive of other embodiments.

In the description of the present application, it should be noted that, unless explicitly specified and defined otherwise, the terms "mounted", "connected", "connect", and "attached" are to be understood in a broad sense, for example, may be fixedly connected, detachably connected, or integrally connected, may be directly connected, may be indirectly connected via an intermediate medium, or may be internal communication between two components. A person of ordinary skill in the art can understand specific meanings of these terms in the present application according to specific situations.

The term "and/or" in this application is only an associative relationship for describing associated objects, indicating that three relationships may be present. For example, A and/or B may indicate three cases: presence of only A; presence of both A and B; and presence of only B. In addition, the symbol "/" in the present application generally represents an "or" relationship between associated objects.

In the embodiments of the present application, the same reference numerals denote the same component, and a detailed description of the same component is omitted in different embodiments for sake of brevity. It should be understood that the size of various components, such as the thickness, length, and width, and the size of the integrated device, such as the overall thickness, length, and width, in the embodiments of the present application shown in the figures are merely illustrative and should not be construed as limiting the present application.

The term "a plurality" as used herein refers to more than two (including two).

In the embodiments of the present application, the battery cell may be a secondary battery, and the secondary battery refers to a battery cell that may be continuously used by activating an active material by charging the battery cell after discharging thereof.

The battery cell may be a lithium ion battery, a sodium ion battery, a sodium-lithium ion battery, a lithium metal battery, a sodium metal battery, a lithium-sulfur battery, a magnesium ion battery, a nickel-hydrogen battery, a nickel-cadmium battery, a lead-acid battery, or the like, without limitation for the battery cell in the embodiments of the present application.

The battery cell generally includes an electrode assembly. The electrode assembly includes a positive electrode, a negative electrode, and a spacer. During charge and discharge of the battery cell, intercalation/de-intercalation of active ions (e.g., lithium ions) are enabled at the positive electrode and negative electrode by moving the active ions between the positive electrode and negative electrode. The spacer is provided between the positive electrode and the negative electrode to prevent the positive and negative electrodes from being short-circuited and to allow active ions to pass therethrough.

In some embodiments, the positive electrode and negative electrode may be a positive plate which may include a positive current collector and a positive active material disposed on at least one surface of the positive current collector.

As an example, the positive current collector has two surfaces opposite in its own thickness direction, and the positive active material is provided on either one or both of the two opposite surfaces of the positive current collector.

As an example, for the positive current collector, a metal foil or a composite current collector may be employed. For example, as the metal foil, aluminum or stainless steel which is subjected to surface treatment by silver, stainless steel, copper, aluminum, nickel, carbon electrode, carbon, nickel, titanium, or the like can be employed. The composite current collector may include a high-molecular material base layer and a metal layer. The composite current collector may be formed by forming a metal material (aluminum, an aluminum alloy, nickel, a nickel alloy, titanium, a titanium alloy, silver, a silver alloy, or the like) on a substrate of a high-molecular material (a substrate of polypropylene, polyethylene terephthalate, polybutylene terephthalate, polystyrene, polyethylene, or the like).

As an example, the positive active material may include at least one of a lithium-containing phosphate, a lithium-transition metal oxide, and respective modified compounds thereof. However, the present application is not limited to these materials, and other conventional materials that can be used as a positive electrode active material of a battery may also be used. These positive electrode active materials may be used alone or in combination of two or more thereof. Here, examples of the lithium-containing phosphate may include, but are not limited to, at least one of lithium iron phosphate (e.g., $LiFePO_4$, also referred to as LFP), a composite material of lithium iron phosphate and carbon, lithium manganese phosphate (e.g., $LiMnPO_4$), a composite material of lithium manganese phosphate and carbon, lithium ferro-manganese phosphate, and a composite material of lithium ferro-manganese phosphate and carbon. Examples of the lithium-transition metal oxide may include, but are not limited to, at least one of lithium cobalt oxide (e.g., $LiCoO_2$), lithium nickel oxide (e.g., $LiNiO_2$), lithium manganese oxide (e.g., $LiMnO_2$, and $LiMn_2O_4$), lithium nickel cobalt oxide, lithium manganese cobalt oxide, lithium nickel manganese oxide, lithium nickel cobalt manganese oxide (e.g., $LiNi_{1/3}$, $Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g., $LiNi_{0.80}Co_{0.15}Al_{0.05}O_2$), a modified compound thereof and the like.

In some embodiments, a foamed metal may be used for the positive electrode. The foamed metal may be foamed nickel, foamed copper, foamed aluminum, foamed alloy, foamed carbon, or the like. When the foamed metal is used as the positive electrode, its surface the foamed metal may not be provided with the positive active material, and of course, the positive active material may be provided. As an example, within the foamed metal, a lithium source material, which is a lithium metal and/or a lithium-rich material, a potassium metal or a sodium metal may also be filled or/and deposited.

In some embodiments, the negative electrode may be a negative plate that may include a negative current collector.

As an example, for the negative current collector, a metal foil, a foamed metal, or a composite current collector may be employed. For example, as the metal foil, aluminum or stainless steel which is subjected to surface treatment by silver, stainless steel, copper, aluminum, nickel, carbon electrode, carbon, nickel, titanium, or the like can be employed. The foamed metal may be foamed nickel, foamed copper, foamed aluminum, foamed alloy, foamed carbon, or the like. The composite current collector may include a high-molecular material base layer and a metal layer. The composite current collector may be formed by forming a metal material (copper, a copper alloy, nickel, a nickel alloy, titanium, a titanium alloy, silver, a silver alloy, or the like) on a substrate of a high-molecular material (a substrate of polypropylene, polyethylene terephthalate, polybutylene terephthalate, polystyrene, polyethylene, or the like).

As an example, the negative plate may include a negative current collector and a negative active material provided on at least one surface of the negative current collector.

As an example, the negative current collector has two surfaces opposite in its own thickness direction, and the negative active material is provided on either one or both of the two opposite surfaces of the negative current collector.

As an example, for the negative active material, a negative active material which is known in the art for a battery cell may be used. As an example, the negative electrode active material may include at least one of the following materials: synthetic graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, this application is not limited to these materials, and another conventional material that can be used as a negative electrode active material of a battery may also be used. These negative electrode active materials may be used alone or in combination of two or more thereof.

In some embodiments, the material of the positive current collector may be aluminum and the material of the negative current collector may be copper.

In some implementations, the electrode assembly further includes a separator provided between a positive electrode and a negative electrode.

In some implementations, the spacer is a separator. The type of the separator is not particularly limited in this application, and any well-known porous separator with good chemical stability and mechanical stability may be used.

As an example, the main material of the separator may be selected from at least one of glass fiber, non-woven fabric, polyethylene, polypropylene, polyvinylidene fluoride, and ceramics. The separator may be a single-layer thin film or may be a multi-layer composite thin film, which is not particularly limited. When the separator is a multi-layer composite thin film, materials of each layer may be the same or different, which is not particularly limited. The spacer may be a single component located between the positive electrode and negative electrode, or may be attached to the surfaces of the positive electrode and negative electrode.

In some implementations, the spacer is a solid electrolyte. The solid electrolyte is disposed between the positive electrode and the negative electrode, and serves to transfer ions and separate the positive electrode and negative electrode.

In some implementations, the battery cell further comprises an electrolyte that functions to conduct ions between the positive electrode and negative electrode. The type of the electrolyte is not specifically limited in this application, and may be selected according to a requirement. The electrolyte may be liquid, gel, or solid.

Here, a liquid electrolyte comprises an electrolyte salt and a solvent.

In some implementations, the electrolyte salt may be selected from at least one of lithium hexafluorophosphate, lithium tetrafluoroborate, lithium perchlorate, lithium hexafluoroarsenate, lithium bisfluorosulfonylimide, lithium bistrifluoromethanesulfonylimide, lithium trifluoromethanesulfonate, lithium difluorophosphate, lithium difluorooxalatoborate, lithium dioxalatoborate, lithium difluorodioxalatophosphate, and lithium tetrafluorooxalatophosphate.

In some implementations, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone. The solvent may also be selected from ether solvents. The ether solvent may include one or more of ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyltetrahydrofuran, diphenyl ether, and a crown ether.

Here, a gel electrolyte comprises a backbone network using a polymer as an electrolyte, in combination with an ionic liquid-lithium salt.

Here, a solid electrolyte includes a polymer solid electrolyte, an inorganic solid electrolyte, and a composite solid electrolyte.

As an example, the polymer solid electrolyte may be polyether (polyethylene oxide), polysiloxane, polycarbonate, polyacrylonitrile, polyvinylidene fluoride, polymethyl methacrylate, a single-ion polymer, a poly-ionic liquid-lithium salt, cellulose, or the like.

As an example, the inorganic solid electrolyte may be one or more of an oxide solid electrolyte (crystalline perovskites, Na superconducting ion conductors, and garnets, amorphous LiPON thin films), a sulfide solid electrolyte (crystalline lithium-superion conductors (lithium germanium phosphorus sulfide, and argyrodite), and amorphous sulfides), and a halide solid electrolyte, a nitride solid electrolyte, and a hydride solid electrolyte.

As an example, the composite solid electrolyte is formed by adding an inorganic solid electrolyte filler in a polymer solid electrolyte.

In some implementations, the electrode assembly is a wound structure. The positive electrode plate and the negative electrode plate are wound in a winding structure.

In some implementations, the electrode assembly is a laminated structure.

As an example, a plurality of positive plates and a plurality of negative plates may be provided, and are alternately laminated.

As an example, a plurality of positive plates may be provided, the negative plate may be folded to form a plurality of laminated folding sections, and one positive plate is sandwiched between adjacent folding sections.

As an example, the positive plate and negative plate are both folded to form a plurality of laminated folding sections.

As an example, a plurality of spacers may be provided, between any adjacent positive plates or negative plates respectively.

As an example, the spacer may be continuously provided between any adjacent positive plates or negative plates by folding or winding.

In some embodiments, the electrode assembly may have a cylindrical shape, a flat shape, a polygonal column shape, or the like.

In some implementations, the electrode assembly is provided with a tab that may conduct current from the electrode assembly. The tab includes a positive tab and a negative tab.

In some implementations, the battery cell may include a housing. The housing is used to enclose components such as the electrode assembly and the electrolyte. The housing may be a steel housing, an aluminum housing, a plastic housing (e.g., polypropylene), a composite metal housing (e.g., a copper-aluminum composite housing), an aluminum plastic film, or the like.

As an example, the battery cell may be a cylindrical battery cell, a prismatic battery cell, a pouch battery cell, or an another shaped battery cell, and the prismatic battery cell includes a square-housing battery cell, a blade-shaped battery cell, and a multi-prism battery cell, for example, a hexagonal battery cell, and the like, and the present application is not particularly limited.

A battery mentioned in the embodiments of the present application refers to a single physical module including one or a plurality of battery cells to provide a higher voltage and capacity.

In some embodiments, the battery may be a battery module, and when there are a plurality of battery cells, the plurality of battery cells are arranged and fixed to form a battery module.

In some embodiments, the battery may be a battery pack including a box and a battery cell, and the battery cell or the battery module is accommodated in the box.

In some embodiments, the box may be a part of a chassis structure of a vehicle. For example, a part of the box may be at least a part of a floor of a vehicle, or a part of the box may be at least a part of a cross beam and a side beam of a vehicle.

In some embodiments, the battery may be an energy storage device. The energy storage device includes an energy storage container, an energy storage cabinet, and the like.

In the development of battery technologies, various design factors, for example, performance parameters such as energy density, cycle life, discharge capacity, and charge/discharge rate are simultaneously taken into consideration. In addition, reliability of the battery needs to be taken into consideration.

The pressure relief mechanism on the battery cell is vital to its reliability. For example, when a phenomenon such as a short circuit, overcharge, etc. occurs, it is possible to cause thermal runaway in a battery cell, thereby increasing a pressure rapidly. In this case, the internal pressure may be externally released by actuating the pressure relief mechanism to reduce a risk of explosion or ignition of a battery cell.

The pressure relief mechanism refers to an element or a component that is actuated to drain internal gas in the case where the internal pressure or temperature of the battery cell reaches a predetermined threshold. The threshold value design varies depending on design requirements. The threshold value may depend on the material of one or more of the positive electrode plate, the negative electrode plate, the electrolyte, and the separator in the battery cell.

The pressure relief mechanism may be in the form of, for example, an explosion-proof valve, a gas valve, a pressure relief valve, a safety valve, or the like, and may specifically be a pressure-sensitive assembly or configuration. That is, when the internal pressure of the battery cell reaches a predetermined threshold value, the pressure relief mechanism performs an action or a weak region provided in the pressure relief mechanism is broken, thereby forming an opening or a channel through which the internal pressure can be drained. Alternatively, the pressure relief mechanism may be a temperature-sensitive assembly or configuration. That is, when the internal temperature of the cell reaches a predetermined threshold, the pressure relief mechanism performs an action to form an opening or channel for internal pressure draining.

"Actuate" mentioned herein refers to that the pressure relief mechanism takes an action or is activated in a state such that the internal pressure of the battery cell is drained. The action taken by the pressure relief mechanism may include, but is not limited to, breaking, rupturing, tearing or opening, etc of at least a portion of the pressure relief mechanism. When the pressure relief mechanism is actuated, high-temperature and high-pressure materials inside the battery cell are outward discharged as discharge materials from an actuated portion. In this way, the battery cell can be subjected to pressure relief at a controlled pressure, thereby avoiding a potentially more serious accident.

Emissions mentioned herein from a battery cell include, but are not limited to, electrolytes, dissolved or fragmented positive and negative electrode plates, fragments of separators, high-temperature high-pressure gas generated by reactions, flames, and the like.

A battery generally has a plurality of battery cells arranged therein. When a certain battery cell is subject to thermal runaway, high-temperature materials (such as high-temperature gas, high-temperature particles, etc.) inside the battery cell are drained after the pressure relief mechanism is actuated; and when the drained high-temperature gas flows through a normal battery cell, its pressure relief mechanism may be heated to induce a cracking failure risk of the pressure relief mechanism of the normal battery cell, causing problems, such as a failure or thermal runaway etc., of the normal battery cell, to affect reliability of a battery.

Given this, the embodiments of the present application provide a technical solution, which, by covering an outer side of a pressure relief mechanism with a protective member having a relatively high melting point, isolate at least a part of a high-temperature material from the pressure relief mechanism to reduce the amount of heat transferred to the pressure relief mechanism, thereby reducing a cracking failure risk of the pressure relief mechanism to increase reliability of a battery cell.

The battery cell described in the embodiments of the present application is applicable to a battery, and an electric device using the battery.

The battery cell, battery and electric device disclosed in the embodiments of the present application can be applied to an electric device using a battery as a power supply or various energy storage systems using a battery as an energy storage component. The electric device can be, but is not limited to, a mobile phone, a tablet computer, a notebook computer, an electric toy, an electric tool, a battery-powered vehicle, an electric vehicle, a ship, a spacecraft, and the like. The electric toy may include a stationary or mobile electric toy, such as a game machine, an electric car toy, an electric ship toy, an electric airplane toy, and the like, and the spacecraft may be an airplane, a rocket, a space shuttle, a spaceship, etc.

To facilitate description, in the following embodiments, a vehicle is used as an example of the electric device.

FIG. 1 is a schematic structural diagram of a vehicle according to some embodiments of the present application.

As shown in FIG. 1, inside the vehicle 1, a battery 2 is provided, which may be provided at the bottom, head, or tail of the vehicle 1. The battery 2 may be used to power the vehicle 1, for example, the battery 2 may be used as an operating power source of the vehicle 1.

The vehicle 1 may further include a controller 3 and a motor 4, and the controller 3 is used to control the battery 2 to power the motor 4, for example, for a working power requirement for the vehicle 1 during starting, navigating, and driving the vehicle 1.

In some embodiments of the present application, the battery 2 may be used not only as an operating power source for the vehicle 1, but also as a driving power source for the vehicle 1, instead of or partially instead of fuel or natural gas to provide driving power for the vehicle 1.

Figure 2:
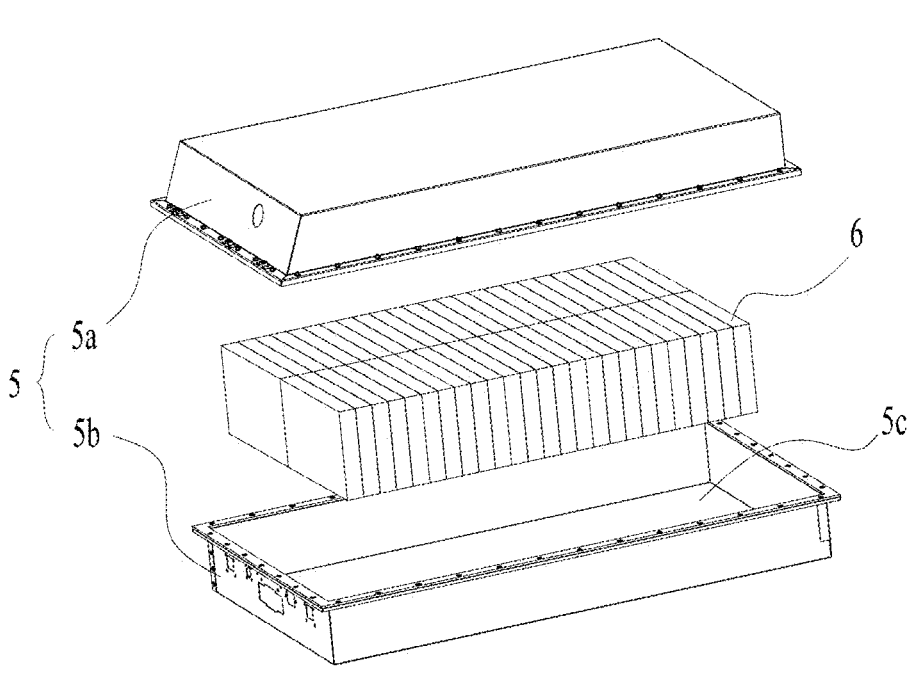
FIG. 2 is an exploded schematic view of a battery according to some embodiments of the present application.

FIG. 2 is an exploded schematic view of a battery according to some embodiments of the present application. As shown in FIG. 2, the battery 2 includes a box 5 and a battery cell 6. The battery cell 6 is accommodated in the box 5.

The box 5 is used to accommodate the battery cell 6, and the box 5 may have various structures. In some embodiments, the box 5 may include a first box portion 5a and a second box portion 5b, the first box portion 5a and the second box portion 5b cover each other, and the first box portion 5a and the second box portion 5b jointly define the accommodation space 5c for accommodating the battery cell

6. The second box portion 5*b* may be a hollow structure with an opening at one end, the first box portion 5*a* is a plate-shaped structure, and the first box portion 5*a* covers an opening side of the second box portion 5*b* to form the box 5 having the accommodation space 5*c*; and the first box portion 5*a* and second box portion 5*b* may also both be a hollow structure with an opening at one end, and an opening side of the first box portion 5*a* covers an opening side of the second box portion 5*b* to form the box 5 having the accommodation space 5*c*. Certainly, the first box portion 5*a* and second box portion 5*b* may be in various shapes such as cylinder, rectangular cuboid, etc.

To increase sealing performance after the first box portion 5*a* and the second box portion 5*b* are connected, a sealing member, for example, a sealant or a sealing ring or the like may be provided between the first box portion 5*a* and the second box portion 5*b*.

Assuming that the first box portion 5*a* covers the top of the second box portion 5*b*, the first box portion 5*a* may also be referred to as an upper box cover, and the second box portion 5*b* may also be referred to as a lower box.

In the battery 2, one or more battery cells 6 may be provided. If a plurality of battery cells 6 are provided, the plurality of battery cells 6 may be subjected to series connection, parallel connection, or series-parallel connection, and the series-parallel connection means that the plurality of battery cells 6 are subjected to both series connection, and parallel connection. The plurality of battery cells 6 may be subjected to series connection, parallel connection, or series-parallel connection directly, and then an integration formed by the plurality of battery cells 6 is accommodated in the box 5. Certainly, alternatively, a battery module may be formed by integrating the plurality of battery cells 6 by series connection, parallel connection, or series-parallel connection, and then a plurality of battery modules are integrated by series connection, parallel connection, or series-parallel connection, and accommodated in the box 5.

Figure 3:
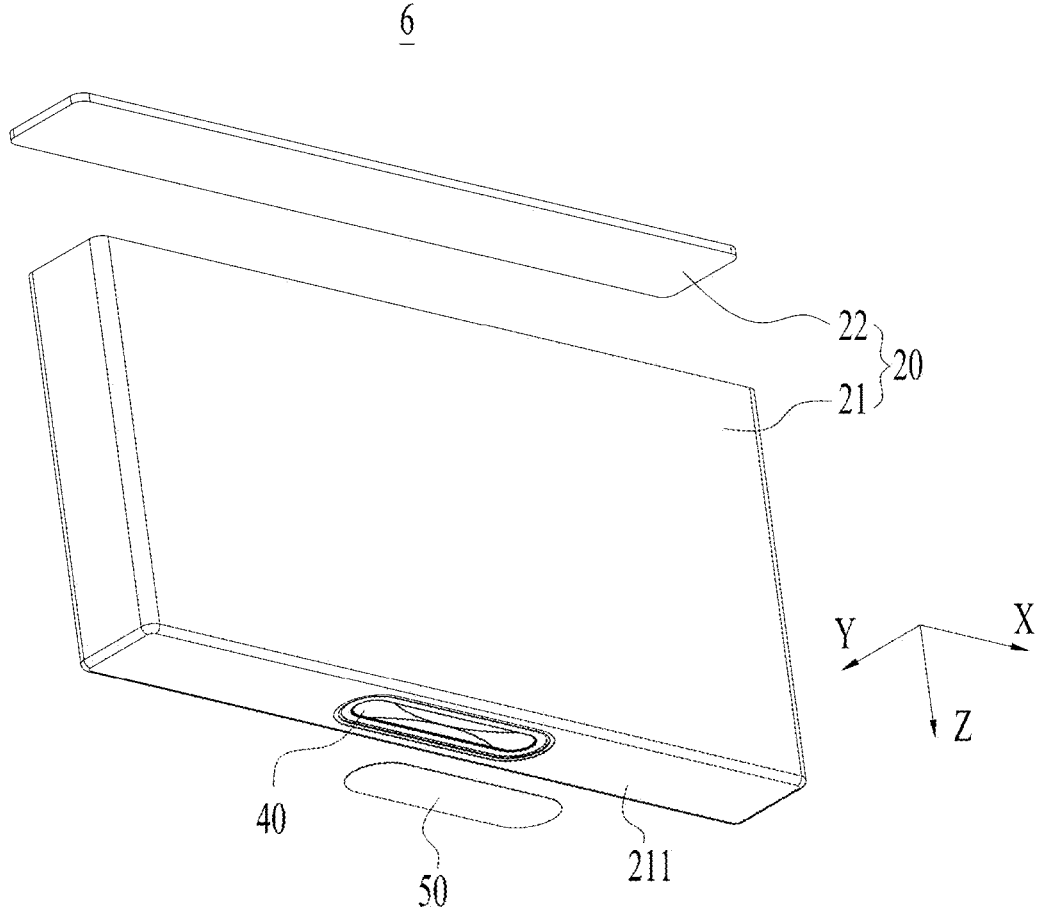
FIG. 3 is an exploded schematic view of a battery cell according to some embodiments of the present application.
Figure 4:
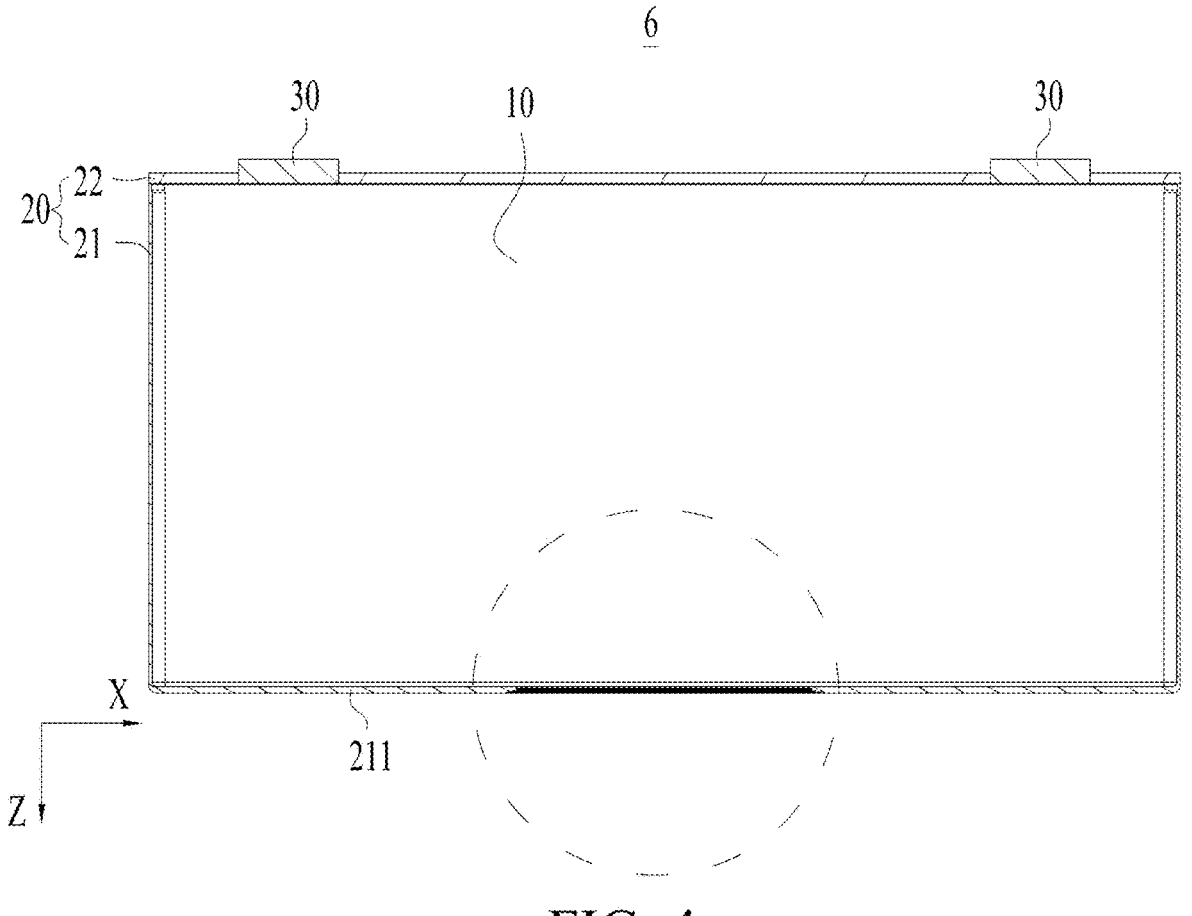
FIG. 4 is a schematic sectional diagram of a battery cell according to some embodiments of the present application.
Figure 5:
FIG. 5 is an enlarged schematic view at a circle in FIG. 4.
Figure 6:
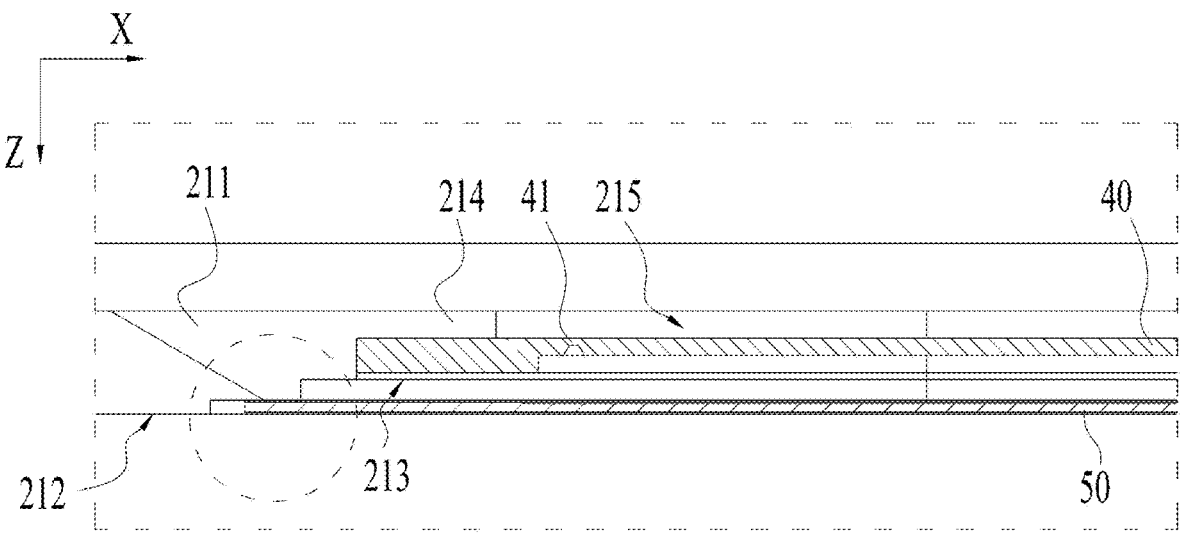
FIG. 6 is an enlarged schematic view at a block in FIG. 5.
Figure 7:
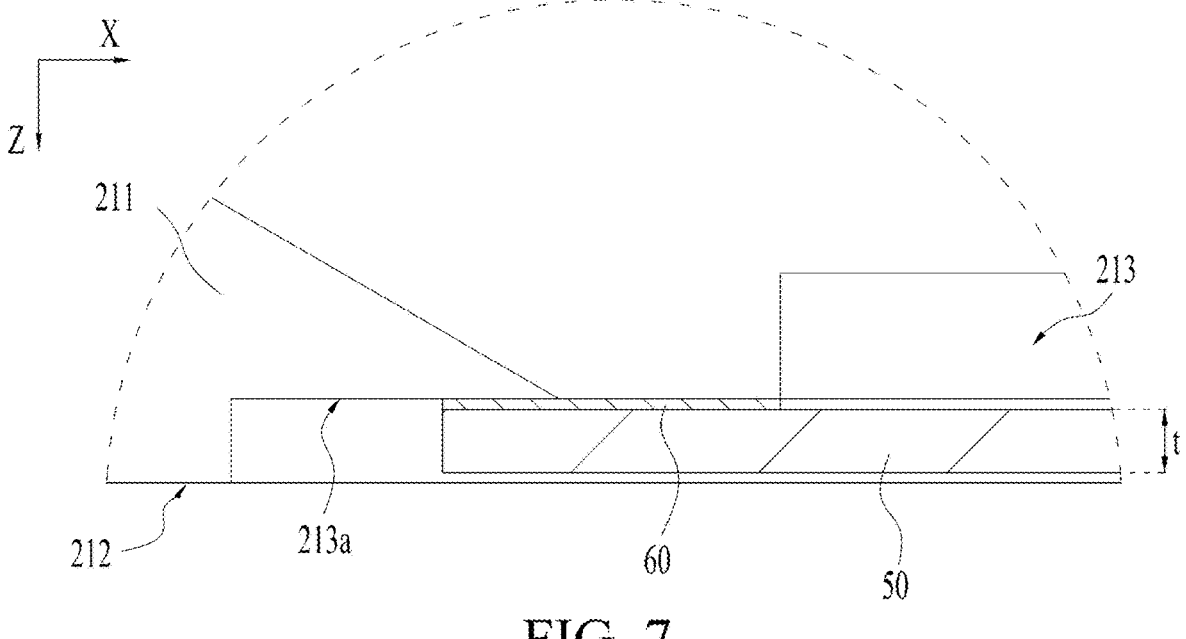
FIG. 7 is an enlarged schematic view at a circle in FIG. 6.

FIG. 3 is an exploded schematic view of a battery cell according to some embodiments of the present application; FIG. 4 is a schematic sectional diagram of a battery cell according to some embodiments of the present application; FIG. 5 is an enlarged schematic view at a circle in FIG. 4; FIG. 6 is an enlarged schematic view at a block in FIG. 5; and FIG. 7 is an enlarged schematic view at a circle in FIG. 6.

Referring to FIGS. 3 to 7, the embodiment of the present application provides a battery cell 6 including a housing 20, an electrode assembly 10, and other functional components (e.g., electrode terminals 30 provided in the housing 20), and at least a part of the electrode assembly 10 is accommodated in the housing 20.

The housing 20 has a hollow structure with an accommodation space formed therein for accommodating the electrode assembly 10 and an electrolyte. Specifically, the shape of the housing 20 may be determined based on a specific shape of the electrode assembly 10. For example, if the electrode assembly 10 has a rectangular parallelepiped structure, a rectangular parallelepiped housing may be used; and if the electrode assembly 10 has a cylindrical structure, a cylindrical housing may be used.

As an example, the housing 20 includes a case 21 having an opening, and an end cap 22 for covering the opening.

The case 21 is a component to cooperate with the end cap 22 to form an internal cavity of the battery cell 6, where the formed internal cavity may be used to accommodate the electrode assembly 10, electrolyte, and other components.

The case 21 and the end cap 22 may be independent components. Illustratively, an opening may be provided in the case 21, and the inner cavity of the battery cell 6 may be formed by closing the end cap 22 at the opening.

The case 21 may be in various shapes and various dimensions, such as cuboid, cylinder, hexagonal prism, and the like. Specifically, the shape of the case 21 may be determined based on a specific shape and dimension of the electrode assembly 10. The case 21 may be made of various materials, such as copper, iron, aluminum, stainless steel, aluminum alloy, and the like. This is not specially limited in the embodiments of the present application.

The shape of the end cap 22 may adapt to the shape of the case 21 to fit the case 21. The materials for the end cap 12 may be the same as or different from that for the case 21. Alternatively, the end cap 22 may be made of a material with certain hardness and strength (e.g., copper, iron, aluminum, stainless steel, aluminum alloy, plastic, etc). As such, the end cap 22 is less prone to deformation under compressive impact, thereby enabling the battery cell 6 to have higher structural strength and improved reliability.

The end cap 22 is connected to the case 21 by welding, gluing, clipping or other means.

The case 21 may be open at one end or both ends. In some examples, the case 21 may have a structure in which one side is open, and one end cap 22 is provided to cover the case 21. In some other examples, the case 21 may additionally have a structure in which both sides are open, two end caps 22 are provided, and respectively cover two openings of the case 21.

The electrode terminal 30 may be used to be electrically connected to the electrode assembly 10 for outputting electric energy from or inputting electric energy into the battery cell 6.

The electrode assembly 10 is a component in the battery cell 6 in which an electrochemical reaction occurs. The case 21 may include one or more electrode assemblies 10.

As an example, the electrode assembly 10 includes a positive electrode plate and a negative electrode plate. Parts of the positive electrode plate and the negative electrode plate with an active material constitute a main body of the electrode assembly 10, and parts of the positive electrode plate and the negative electrode plate with no active material each constitutes a tab. The tab may include a positive electrode tab and a negative electrode tab. The positive electrode tab and negative electrode tab may both be located at one end of the main body portion or be located at two ends of the main body portion respectively.

During charge-discharge of the battery 2, a positive electrode active material and a negative electrode active material react with the electrolyte, and the tab is connected to an electrode terminal 30 to form a current circuit.

In some embodiments, the battery cell 6 includes a housing 20 including a wall portion 211 and a pressure relief mechanism 40 disposed at the wall portion 211, and the pressure relief mechanism 40 can be actuated to release gas within the housing 20 in a case where the internal pressure or temperature of the battery cell 6 reaches a threshold value.

As an example, the wall portion 211 may be the end cap 22 or a wall of the case 21.

As an example, the wall portion 211 may be circular, rectangular, elliptical, or in other shapes.

In some examples, the pressure relief mechanism 40 and the wall portion 211 are separately molded components and may be connected by welding, bonding, or the like. For example, the wall portion 211 is provided with a pressure relief hole that penetrates the wall portion 211, and the pressure relief mechanism 40 is installed at the wall portion 211 and covers the pressure relief hole, to separate inner-side space and outer-side space of the wall portion 211. In an alternative embodiment, the pressure relief mechanism 40 and the wall portion 211 may also be integrated structures.

The threshold value design varies depending on design requirements. The threshold value may depend on the material of one or more of the positive electrode, the negative electrode, the electrolyte, and the separator in the battery cell 6.

In the case where the internal pressure or temperature of the battery cell 6 reaches a threshold value, the pressure relief mechanism 40 is actuated to release the gas within the housing 20, thereby draining the internal pressure of the battery cell 6. As an example, other high temperature materials, such as particles, debris, etc., may also be drained when the pressure relief mechanism 40 is actuated.

The internal pressure of the battery cell 6 may be the internal pressure of the housing 20, and the internal temperature of the battery cell 6 may be the internal temperature of the housing 20.

Actuation of the pressure relief mechanism 40 may be triggered solely by the internal pressure of the housing 20, solely by the internal temperature of the housing 20, or by a combination of the internal pressure and the internal temperature of the housing 20.

As an example, when the battery cell 6 has thermal runaway, the internal pressure of the housing 20 may reach or even exceed a pressure threshold value as gas is accumulated within the housing 20. In the case where the internal pressure of the housing 20 reaches a threshold value, the pressure relief mechanism 40 is actuated to form an exhaust channel to communicate the internal space of the housing 20 with external space, and the gas inside the housing 20 can be discharged through the exhaust channel, thereby reducing the explosion risk of the battery cell 6.

As an example, when an electrolyte and an active material react to rapidly release heat, an increase in the internal temperature of the housing 20 is triggered, and such an increase in temperature also causes an increase in the internal pressure of the housing 20. In the case where the internal temperature of the housing 20 reaches a threshold value, the pressure relief mechanism 40 may be actuated under the action of the temperature and pressure to form an exhaust channel to communicate the internal space of the housing 20 with external space, and the gas inside the housing 20 can be discharged through the exhaust channel, thereby reducing the explosion risk of the battery cell 6.

In some embodiments, the battery cell 6 further includes a protective member 50 having a melting point greater than or equal to 300° C. In the thickness direction Z of the wall portion 211, the protective member 50 covers at least a part of the pressure relief mechanism 40.

The melting point of the protective member 50 refers to the melting point of the protective member 50 at atmospheric pressure. Alternatively, the melting point of the protective member 50 may be 300° C., 500° C., 700° C., 900° C., 1000° C., 1500° C., 2000° C., or 2500° C.

In the thickness direction Z of the wall portion 211, at least a part of the protective member 50 is located at the side of the pressure relief mechanism 40 facing away from the electrode assembly 10. In the thickness direction Z of the wall portion 211, the projection of the protective member 50 at least partially overlaps with that of the pressure relief mechanism 40.

In the thickness direction Z, the protective member 50 may entirely cover the pressure relief mechanism 40, or cover only a part of the pressure relief mechanism 40.

The protective member 50 and the pressure relief mechanism 40 are provided at intervals or may contact with each other in the thickness direction.

The protective member 50 may be connected to the wall portion 211 or the pressure relief mechanism 40.

As an example, when the pressure relief mechanism 40 is actuated, the protective member 50 may be broken, ruptured, opened, fly off, or produce other actions under the internal pressure of the cell 6 to reduce blocking to gas by the protective member 50.

When the battery cell 6 is subjected to thermal runaway, the pressure relief mechanism 40 is actuated to release the gas within the housing 20, so as to reduce risks of explosion and ignition of the battery cell to increase its reliability. The protective member 50 can isolate external impurities (such as dust, particles, etc.) to reduce corrosion or damage to the pressure relief mechanism 40 by the impurities, increasing reliability of the pressure relief mechanism 40. The protective member 50 has a melting point greater than or equal to 300° C. and can withstand relatively strong thermal shock. In a case where a high-temperature material (e. g., high-temperature gas released from other battery cell 6) flows through the battery cell 6, the protective member 50 can withstand the thermal shock of the high-temperature material and is less likely to have problems such as deformation, melting through, etc., so that the pressure relief mechanism 40 is isolated from at least a part of the high-temperature material to reduce a heat amount transferred to the mechanism 40, reducing a cracking failure risk of the pressure relief mechanism 40, and increasing the reliability of the battery cell 6.

In some embodiments, the pressure relief mechanism 40 is provided with a weak portion 41. The weak portion 41 is a portion having a relatively small strength of the pressure relief mechanism 40, which is a portion of the pressure relief mechanism 40 that is easily broken, ruptured, torn, or opened. Illustratively, the pressure relief mechanism 40 has a strength less than that of a portion of the pressure relief mechanism 40 near the weak portion 41.

In some examples, grooves, scores, through-holes, or other structures may be provided in a predetermined region of the pressure relief mechanism 40 to reduce a local strength of the pressure relief mechanism 40, thereby forming the weak portion 41 at the pressure relief mechanism 40. For example, a predetermined region of the pressure relief mechanism 40 is thinned, and the thinned portion of the pressure relief mechanism 40 forms the weak portion 41. In some other examples, a predetermined region of the pressure relief mechanism 40 may be subjected to material processing, so that the region has a strength weaker than that of other regions, in other words, the region is the weak portion 41.

The weak portion 41 can be broken in a case where the internal pressure or temperature of the battery cell 6 reaches a threshold value to release gas within the housing 20.

In some embodiments, the pressure relief mechanism 40 and the wall portion 211 are separately molded components and may be connected by welding. In some other embodiments, the pressure relief mechanism 40 and the wall portion 211 are integrated members, and the pressure relief mechanism 40 includes the weak portion 41 and an region surrounded by the weak portion 41.

In some embodiments, the protective member 50 covers the weak portion 41 in the thickness direction Z. In the thickness direction Z, the protective member 50 may cover a part of the weak portion 41 or completely cover the weak portion 41.

The protective member 50 can reduce the risk that a high-temperature material directly impacts the weak portion 41 and reduce the thermal impact received by the weak portion 41, so as to reduce a cracking failure risk of the weak portion 41, increasing the reliability of the battery cell 6.

Alternatively, in the thickness direction Z, the protective member 50 completely covers the weak portion 41.

In some embodiments, in any direction perpendicular to the thickness direction Z, the protective member 50 has a size greater than or equal to that of the pressure relief mechanism 40, so that the protective member 50 completely covers the pressure relief mechanism 40.

In some embodiments, the wall portion 211 has an outer surface 212 and the wall portion 211 is provided with an accommodating recess 213 recessed relative to the outer surface 212.

The outer surface 212 may be a surface of the wall portion 211 facing away from the electrode assembly 10. Alternatively, the outer surface 212 may be planar.

As an example, the shape of the accommodation recess 213 may be a columnar shape, a tapered shape, a stepped shape, or another shape.

In some embodiments, at least a part of the protective member 50 is accommodated in the accommodating recess 213. The protective member 50 may be wholly accommodated in the accommodating recess 213, or only a part of the protective member 50 may be accommodated in the accommodating recess 213.

By providing the accommodating recess 213 and providing at least a part of the protective member 50 in the accommodating recess 213, it is possible to reduce the space occupied by the battery cell 6 in the thickness direction Z, increasing the space utilization rate and energy density of the battery cell 6.

In some embodiments, the protective member 50 is completely accommodated in the accommodating recess 213. In the thickness direction Z, the surface of the protective member 50 facing away from the pressure relief mechanism 40 does not exceed the outer surface 212.

The embodiment of the present application may further increase the space utilization rate and energy density of the battery cell 6. In addition, the protective member 50 completely accommodated in the accommodating recess can reduce a risk of friction between the protective member 50 and an external structure in a process for producing, transporting, or using the battery cell 6, to increase the reliability of the protective member 50.

In some embodiments, the bottom wall 214 of the accommodating recess 213 is provided with a through hole 215, and the pressure relief mechanism 40 is accommodated in the accommodating recess 213, is connected to the bottom wall 214, and covers the through-hole 215.

An exhaust channel is formed when the pressure relief mechanism 40 is actuated, and gas within the housing 20 may be drained out of the battery cell 6 through the through hole 215 and the exhaust channel.

In some embodiments, in the thickness direction Z, the protective member 50 and the pressure relief mechanism 40 are provided at intervals.

The embodiments of the present application may reduce a heat transfer rate between the protective member 50 and the pressure relief mechanism 40 to reduce a temperature rise of the pressure relief mechanism 40 when the protective member 50 is thermally shocked by a high-temperature material, reducing a cracking failure risk of the pressure relief mechanism 40.

In some embodiments, the accommodating recess 213 is stepped, and has a side wall on which a stepped surface 213a is provided, and the protective member 50 is connected to the stepped surface 213a, so that the protective member is spaced from the pressure relief mechanism 40.

In some embodiments, there is no other component between the protective member 50 and the pressure relief mechanism 40 in the thickness direction Z.

In the embodiments of the present application, a heat-insulation chamber is formed between the protective member 50 and the pressure relief mechanism 40 to reduce the heat transfer rate between the protective member 50 and the pressure relief mechanism 40. No other physical component between the protective member 50 and the pressure relief mechanism 40 may both reduce blocking to gas when the pressure relief mechanism 40 is actuated, and, to some extent, prevent heat conducting of the physical structure between the protective member 50 and the pressure relief mechanism 40, reducing the heat transfer rate between the protective member 50 and the pressure relief mechanism 40.

In some embodiments, in the thickness direction Z, the minimum spacing between the protective member 50 and the pressure relief mechanism 40 is D, and the minimum thickness of the protective member 50 is t. D and t satisfy $t \times D \geq 0.01$ mm$^2$.

The larger the t is, the lower the temperature of the surface of the protective member 50 facing the pressure relief mechanism 40 is, and the less the amount of heat irritated by the protective member 50 towards the pressure relief mechanism 40 is when a high-temperature material impacts the protective member 50. The smaller the t is, the higher the temperature of the surface of the protective member 50 facing the pressure relief mechanism 40 is, and the more the amount of heat irritated by the protective member 50 towards the pressure relief mechanism 40 is when a high-temperature material impacts the protective member 50.

The larger the D is, the longer the heat transfer path between the protective member 50 and the pressure relief mechanism 40 is, and the smaller the D is, the shorter the heat transfer path between the protective member 50 and the pressure relief mechanism 40 is when the high-temperature material impacts the protective member 50.

In the embodiments of the present application, $t \times D$ is defined to be greater than or equal to 0.01 mm$^2$, so that a temperature rise of the pressure relief mechanism 40 can be reduced when the high-temperature material impacts the protective member 50, reducing a cracking failure risk of the pressure relief mechanism 50.

As an example, $t \times D$ is 0.01 mm$^2$, 0.03 mm$^2$, 0.05 mm$^2$, 0.08 mm$^2$, 0.1 mm$^2$, 0.15 mm$^2$, 0.3 mm$^2$, 0.5 mm$^2$, 0.8 mm$^2$ or 1 mm$^2$.

Optionally, $t \times D \geq 0.05$ mm$^2$. Further optionally, $t \times D \geq 0.1$ mm$^2$.

In some embodiments, t is 0.05 mm-0.4 mm.

The embodiment of the present application defines t being greater than or equal to 0.05 mm, so it is possible to reduce the amount of heat radiated from the protective member 50 to the pressure relief mechanism 40 when the high-temperature material impacts the protective member 50, reducing a temperature rise of the pressure relief mechanism 40. The larger the t is, the large the space occupied by and the weight of the protective member 50 are; and by defining t being greater than or equal to 0.05 mm, it is possible to reduce the space occupied by and the weight of the protective member

50 provided that the protection requirement of the protective member 50 is satisfied, increasing the energy density of the battery cell 6.

Optionally, t may be 0.05 mm, 0.06 mm, 0.08 mm, 0.1 mm, 0.12 mm, 0.15 mm, 0.18 mm, 0.2 mm, 0.22 mm, 0.25 mm, 0.3 mm, 0.32, 0.35 mm, or 0.4 mm.

In some embodiments, t is 0.08 mm-0.2 mm to reduce the space occupied by and the weight of the protective member 50 provided that the protection requirement of the protective member 50 is satisfied, increasing the energy density of the battery cell 6.

In some embodiments, the protective member 50 has a melting point greater than or equal to 500° C. The protective member 50, having a relatively high melting point, is less likely to melt when it is subjected to thermal shock, thereby enabling better thermal shock resistance of the protective member 50 to reduce a melted-through risk of the protective member 50.

In some embodiments, the protective member 50 has a melting point greater than or equal to 1000° C.

In some embodiments, a material for the protective member 50 includes one of mica, rubber, ceramic, or polyimide.

Mica, rubber, ceramic, and polyimide have relatively good thermal shock resistance, thereby providing protection to the pressure relief mechanism 40 to reduce a cracking failure risk of the pressure relief mechanism 40.

In some embodiments, the material of the protective member 50 includes polyimide, and the protective member 50 has a tensile strength of 100 MPa-350 MPa at 150° C.

Illustratively, a thin-film tensile strength tester is used, a gradually increased tensile load is applied in a longitudinal direction of a standard sample at an ambient temperature of 150° C. to deform the sample until it is destroyed, and the maximum tensile stress required when the sample is destroyed is the tensile strength. The tensile strength may also be referred to as a tensile-resistance strength.

The greater the tensile strength of the protective member 50 is, the higher the difficulty that it is broken when pressure relief mechanism 40 is actuated. The embodiment of the present application sets the tensile strength of the protective member 50 less than or equal to 350 MPa at 150° C., so the protective member 50 can be broken in time when the pressure relief mechanism 40 is actuated, increasing gas discharging efficiency.

The smaller the tensile strength of the protective member 50 is, the larger the deformation of the protective member 50 is when external air pressure fluctuates, and the easier the fatigue deformation of protective member 50 is as use time increases. The embodiment of the present application sets the tensile strength of the protective member 50 greater than or equal to 100 MPa at 150° C., so it is possible to slow aging of the protective member, extending the service life of the battery cell 6.

Optionally, the protective member 50 has a tensile strength of 100 MPa, 120 MPa, 150 MPa, 170 MPa, 200 MPa, 220 MPa, 250 MPa, 270 MPa, 300 MPa, 320 MPa, or 350 MPa at 150° C.

In some embodiments, the protective member 50 has a tensile strength of 170 MPa-250 MPa at 150° C.

In some embodiments, the housing 20 includes a case 21 having an opening at one end and an end cap 22 connected to the case 21 and covering the opening.

Illustratively, the end cap 22 is located above the electrode assembly 10 in the gravity direction when the battery cell 6 is used upright. When the battery cell 6 is used in an inverted way, the end cap 22 is located below the electrode assembly 10 in the gravity direction.

In some embodiments, the case 21 includes a wall portion 211 opposing to the end cap 22. By providing the pressure relief mechanism 40 on the case 21, more installation space can be prepared for the components on the end cap 22, for example, more installation space can be prepared for the electrode terminal 30.

In some embodiments, the thickness direction Z of the wall portion 211 is parallel to the gravity direction, and the wall portion 211 is located at the lower side of the electrode assembly 10 in the gravity direction.

The wall portion 211 may provide support for the electrode assembly 10 to increase its stability. When the battery cell 6 has thermal runaway, gas may be injected downward, thereby reducing gas discharging resistance to increase gas discharging efficiency.

In some embodiments, the protective member 50 is connected to the wall portion 211 to increase the stability of the protective member 50 and reduce the falling risk of the protective member 50.

Figure 8:
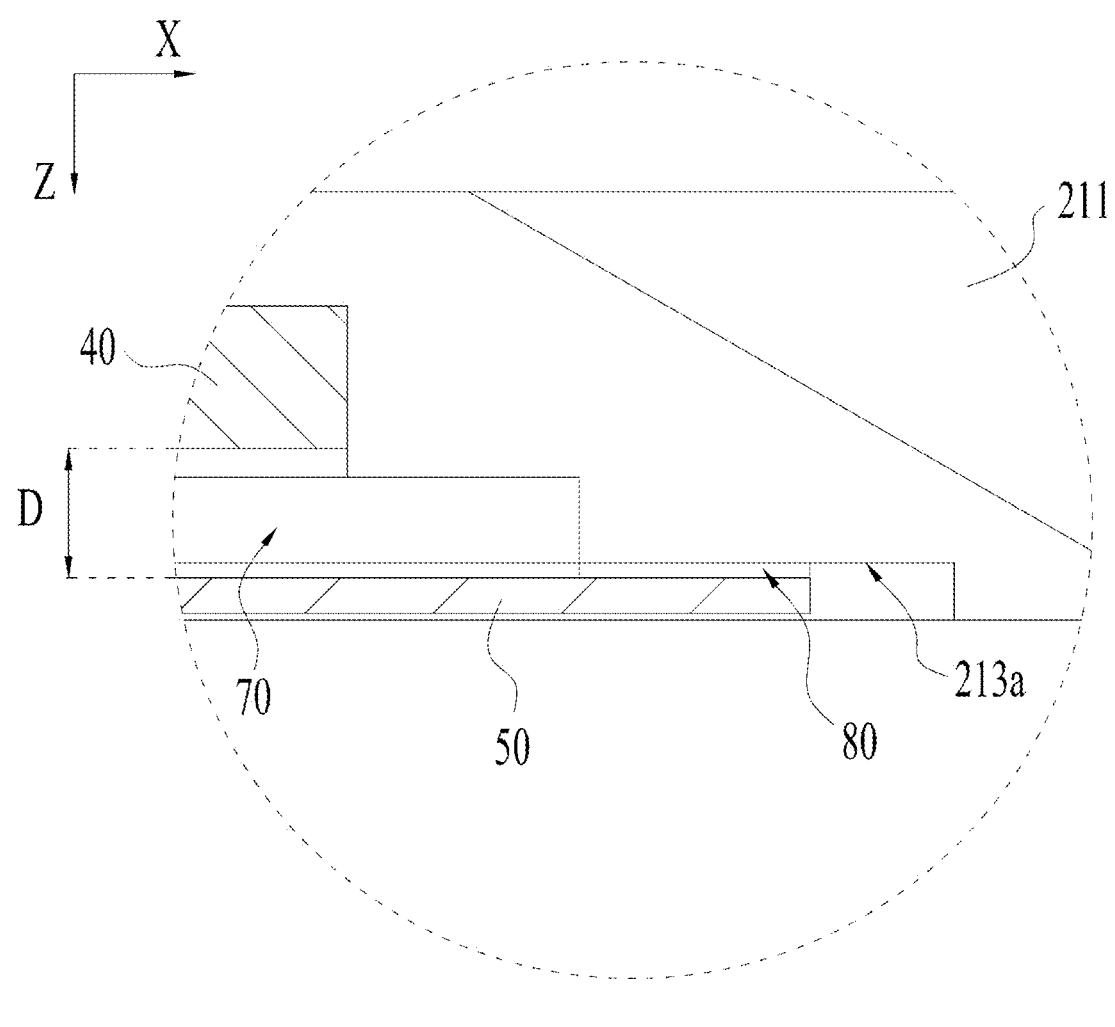
FIG. 8 is an enlarged schematic view at a circle in FIG. 5.
Figure 9:
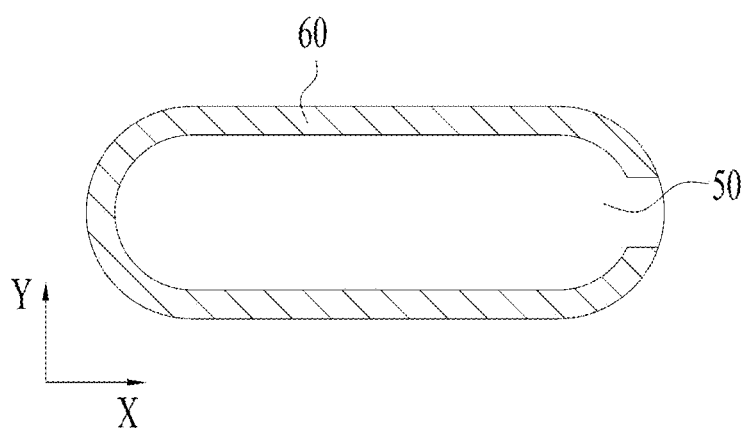
FIG. 9 is a top view of a protective member and a connection layer of a battery cell according to some embodiments of the present application.

FIG. 8 is an enlarged schematic view at a circle in FIG. 5; and FIG. 9 is a top view of a protective member and a connection layer of a battery cell according to some embodiments of the present application.

Referring to FIGS. 6 to 9, in some embodiments, the battery cell 6 further includes a connection layer 60 by which the protective member 50 is connected to the wall portion 211.

The connecting layer 60 may be connected to the wall portion 211 and the protective member 50 by various means. In some examples, by the connecting layer 60, the protective member 50 may be bonded to the wall portion 211. In some other examples, the connecting layer 60 is connected to the protective member 50 and the wall portion 211 by fusing.

In some embodiments, the connection layer 60 can be actuated in a case where the internal pressure or temperature of the battery cell 6 reaches a threshold value to disengage at least part of the protective member 50 from the wall portion 211.

When the internal pressure or temperature of the battery cell 6 reaches a threshold value, the protective member 50 may be entirely or only partially disengaged from the wall portion 211, At least a part of the protective member 50 being disengaged from the wall portion 211 may mean that at least a part of the protective member 50 is no longer constrained by the wall portion 211 and may be displaced from an initial set position.

"Actuation of the connecting layer 60" means that the connecting layer 60 produces actions or is activated in a certain state such that at least a part of the protective member 50 is disengaged from the wall portion 211. The action produced by the connecting layer 60 may include, but is not limited to, disconnecting at least a part of the connecting layer 60 from the wall portion 211, disconnecting at least a part of the connecting layer 60 from the protective member 50, tearing the connecting layer 60, and the like.

In a case where an internal pressure or temperature of the battery cell 6 reaches a threshold value, the pressure relief mechanism 40 is actuated to release gas within the housing 20, and at least a part of the protective member 50 is disengaged from the wall portion 211 under other internal action, thereby draining gas inside the battery cell 6 to reduce its internal pressure and temperature.

In some embodiments, the connection layer 60 can be actuated in a case where the internal pressure or temperature of the battery cell 6 reaches a threshold value to disengage the whole protective member 50 from the wall portion 211.

When a phenomenon such as a short circuit, overcharge, etc. occurs, the pressure relief mechanism 40 is actuated, and the protective member 50 may be disengaged from the wall portion 211, without blocking the pressure relief mechanism 40, thereby increasing a gas draining rate and reducing the explosion risk of the battery cell 6.

In other embodiments, the protective member 50 may also be broken in a case where the internal pressure or temperature of the battery cell 6 reaches a threshold value to release gas within the housing 20.

In some embodiments, the connecting layer 60 includes an adhesive layer.

As an example, the adhesive layer includes at least one of an epoxy structural adhesive, an acrylate structural adhesive, a polyimide structural adhesive, a maleimide structural adhesive, a polyurethane structural adhesive, and an acryl structural adhesive.

When the battery cell 6 has thermal runaway, heat may be conducted to the connection layer 60, and it softens, so that the protective member 50 can be disengaged from the wall portion 211 in time when the pressure relief mechanism 50 is actuated.

In some embodiments, the connection layer 60 is provided at an outer peripheral region of a surface of the protective member 50 facing the pressure relief mechanism 40.

By providing the connection layer 60 at an outer peripheral region of the protective member 50, it is possible to save the material amount for the connection layer 60 and reduce a risk of connecting the connection layer 60 to the pressure relief mechanism 40.

In some embodiments, the connecting layer 60 is located entirely between the wall portion 211 and the protective member 50 in the thickness direction Z.

In some embodiments, an avoidance space 70 is formed between the protective member 50 and the pressure relief mechanism 40, and a communication flow path 80 is provided between the protective member 50 and the wall portion 211, and one end of the communication flow path 80 communicates with the outside and the other end communicates with the avoidance space 70.

During charge and discharge of the battery cell 6, the internal gas pressure of the battery cell 6 may slightly fluctuate. When the internal gas pressure of the battery cell 6 fluctuates, the pressure relief mechanism 40 may bulge outward. The embodiment of the present application, by providing the communication flow path 80 and allowing the avoidance space 70 to communicate with the external environment, reduce an air-pressure change in the avoidance space 70 when the pressure relief mechanism 40 bulges, reducing deformation of the protective member 50.

Further, in the production process of the battery cell 6, the airtightness at the pressure relief mechanism 40 may be detected by the communication flow path 80 and the relief space 70.

In some embodiments, when the connecting layer 60 is provided, the connecting layer 60 may be unsealed, so that the connecting layer 60, the wall portion 211, and the protective member 50 form the communication flow path 80 by enclosing.

Figure 10:
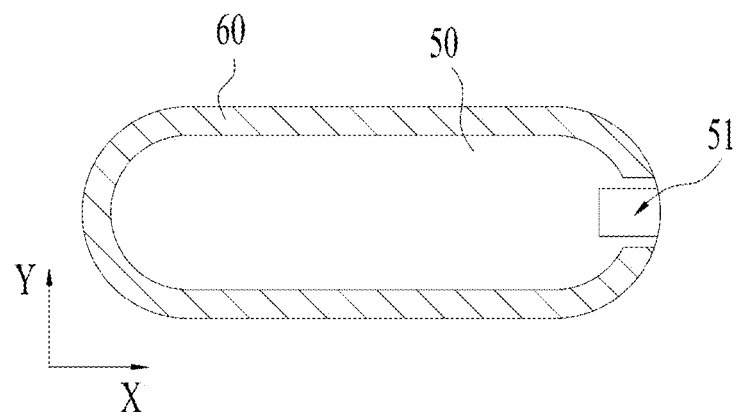
FIG. 10 is a top view of a protective member and a connection layer of a battery cell according to some embodiments of the present application.
Figure 11:
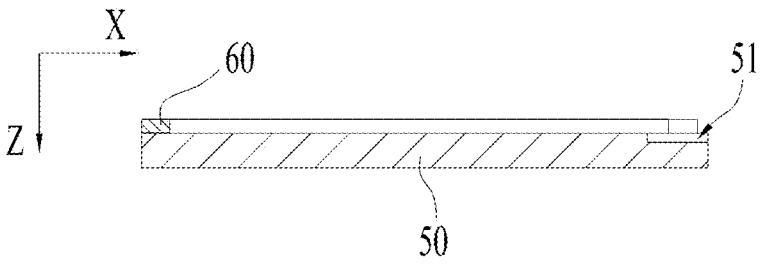
FIG. 11 is a schematic sectional view of a protective member and a connecting layer shown in FIG. 10.

FIG. 10 is a top view of a protective member and a connection layer of a battery cell according to some embodiments of the present application; and FIG. 11 is a schematic sectional view of a protective member and a connecting layer shown in FIG. 10.

As shown in FIGS. 10 and 11, in some embodiments, the communication flow path 80 comprises a groove 51 provided on a surface of the protective member 50 facing the pressure relief mechanism 40.

By providing the groove 51 in the surface of the pressure relief mechanism 40, the avoidance space 70 is communicated with the external environment out of the battery cell 6.

In some embodiments, in the thickness direction Z, the connecting layer 60 is not overlapped with the groove 51, to reduce the risk of filling the connecting layer 60 into the groove 51.

Figure 12:
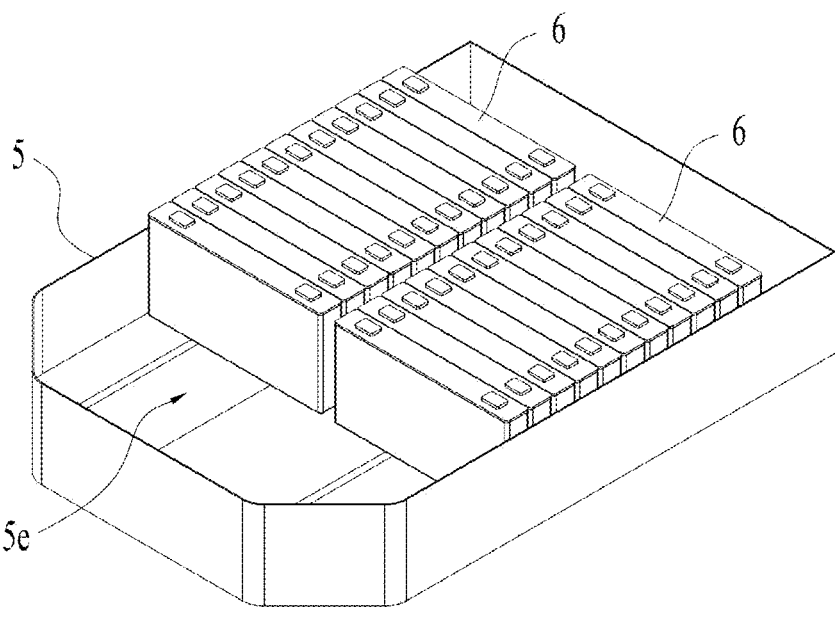
FIG. 12 is a schematic view of a battery according to some embodiments of the present application.
Figure 13:
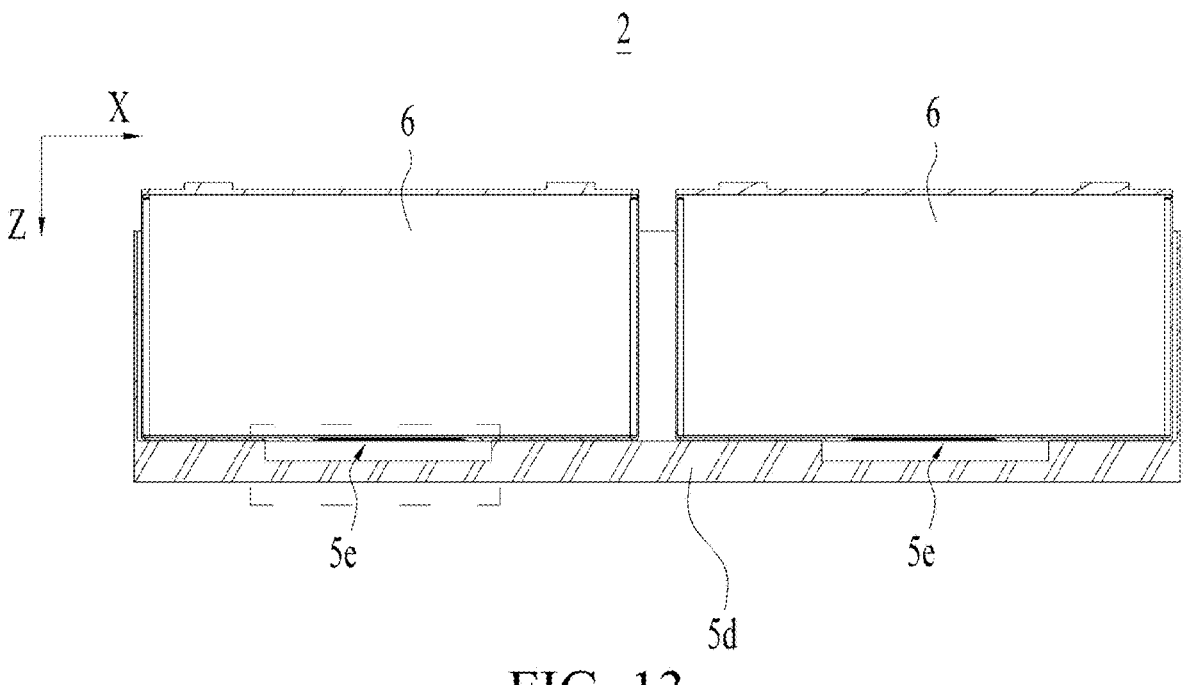
FIG. 13 is a schematic sectional diagram of a battery according to some embodiments of the present application.
Figure 14:
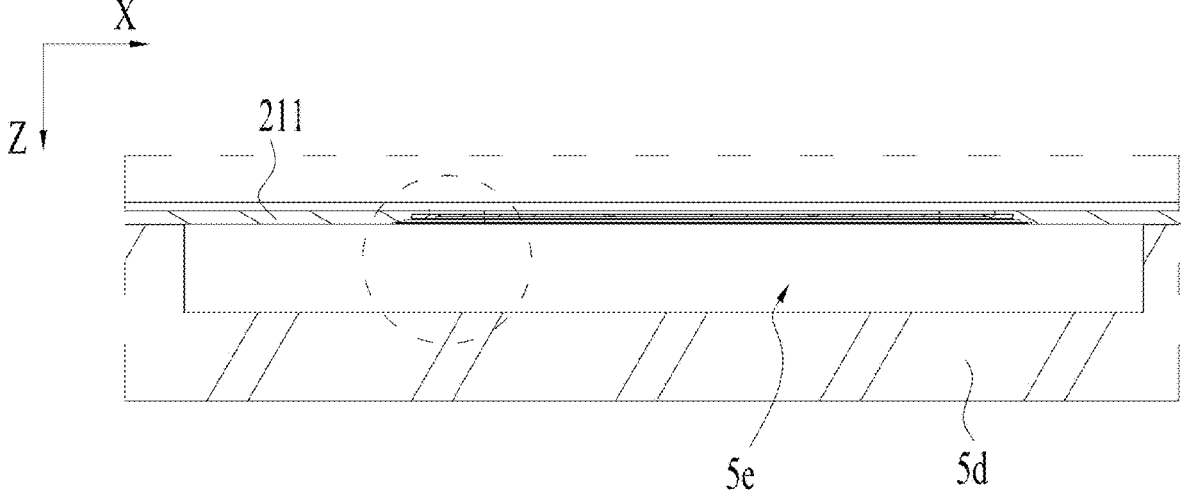
FIG. 14 is an enlarged schematic view at a block in FIG. 13.
Figure 15:
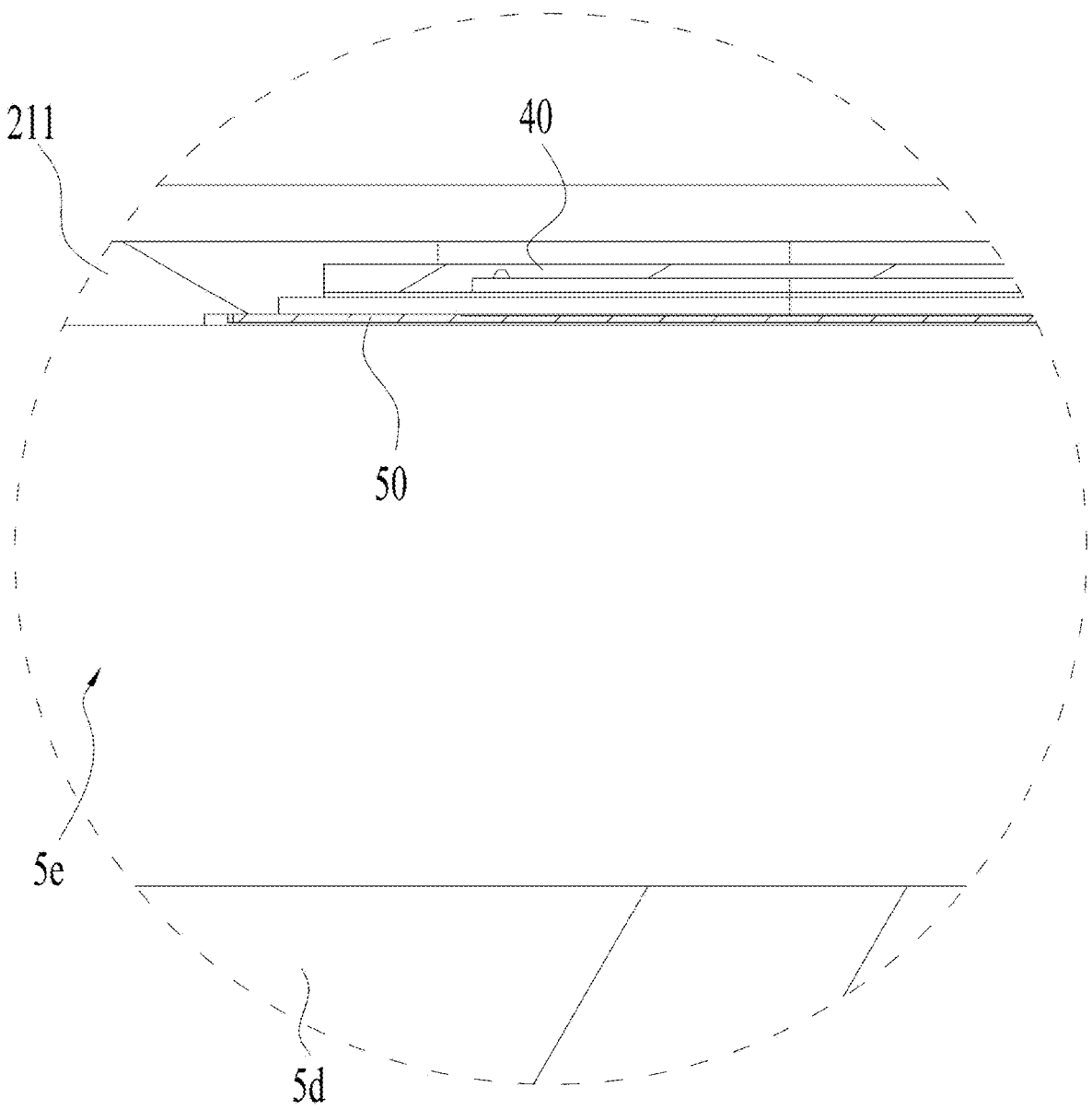
FIG. 15 is an enlarged schematic view at a circle in FIG. 14.

FIG. 12 is a schematic view of a battery according to some embodiments of the present application; FIG. 13 is a schematic sectional diagram of a battery according to some embodiments of the present application; FIG. 14 is an enlarged schematic view at a block in FIG. 13; and FIG. 15 is an enlarged schematic view at a circle in FIG. 14.

Referring to FIGS. 12 to 15, the embodiment of the present application provides a battery 2 including the battery cell 6 provided in any one of the above embodiments.

In some embodiments, the battery 2 further includes a box 5 within which a plurality of battery cells 6 are accommodated. The box 5 includes a first box wall 5d, and a wall portion 211 is provided at an end of the housing 20 facing the first box wall 5d. The inside of the first box wall 5d is provided with a channel 5e. In the thickness direction Z, the projection of the pressure relief mechanism 40 of the plurality of battery cells 6 is located within the projection of the channel 5e. In the thickness direction Z, the protective member 50 is located between the channel 5e and the pressure relief mechanism 40.

When the battery cell 6 is subjected to thermal runaway of, the pressure relief mechanism 40 is actuated to release gas in the housing 20 outward into the channel 5e; and the channel 5e guides flowing of the high-temperature gas to discharge it out of the box 5, reducing an explosion risk of a battery 2. In a process of flowing high-temperature gas in the channel 5e, the protective member 50 can isolate the high-temperature gas from the pressure relief mechanism 40 to reduce the amount of heat conducted to the pressure relief mechanism 40 to reduce its cracking failure risk, so that persistent deterioration of thermal runaway is mitigated to increase the reliability of the battery 2.

In some embodiments, in the thickness direction Z, the projection of the protective member 50 is located within the projection of the channel 5e. When the pressure relief mechanism 40 is actuated, the protective member 50 may enter the channel 5e to drain gas within the housing; and the embodiments of the present application may reduce the risk that the first box wall 5d interferes with the protective member 50, allowing the protective member 50 to smoothly enter the channel 5.

In some embodiments, the dimension of the channel 5e is larger than that of the protective member 50 in any direction perpendicular to the thickness direction Z.

Exemplarily, the size of the channel 5e is larger than that of the protective member 50 in the length direction X of the wall portion 211; and the size of the channel 5e is larger than that of the protective member 50 in the width direction Y of the wall portion 211.

The embodiment of the present application can eliminate the problem that the first wall 5d interferes with the protective member 50 due to an assembly error, so that the protective member 50 can smoothly enter the channel 5e when the battery cell 6 has thermal runaway.

According to some embodiments of the present application, the present application provides an electric device including the battery 2 in any one of the above embodiments, the battery 2 for providing electrical energy to the electric device. The electric device may be any one of the above devices using the battery 2.

Referring to FIGS. 3 to 8, the embodiment of the present application provides a battery cell 6 including a housing 20, an electrode assembly 10, a pressure relief mechanism 40, a protective member 50, and a connection layer 60.

The electrode assembly 10 is accommodated in the housing 20.

The housing 20 includes a case 21 having an opening at one end and an end cap 22 connected to the case 21 and covering the opening. The case 21 includes a wall portion 211 opposing to the end cap 22. The thickness direction Z of the wall portion 211 is parallel to the gravity direction, and the wall portion 211 is located at the lower side of the electrode assembly 10 in the gravity direction.

The wall portion 211 has an outer surface 212 on a side facing away from the electrode assembly 10, and the wall portion 211 is provided with an accommodating recess 213 recessed with respect to the outer surface 212. The bottom wall 214 of the accommodating recess 213 is provided with a through hole 215, and the pressure relief mechanism 40 is accommodated in the accommodating recess 213, is connected to the bottom wall 214, and covers the through hole 215.

The protective member 50 is entirely accommodated in the accommodating recess 213 at a side of the pressure relief mechanism 40 facing away from the electrode assembly 10. In the thickness direction Z, the protective member 50 and the pressure relief mechanism 40 are provided at intervals, and the protective member 50 completely covers the pressure relief mechanism 40.

A stepped surface 213a is provided on a side wall of the accommodation recess 213, and the connection layer 60 is located between the stepped surface 213a and the protective member 50 to connect the protective member 50 to the wall portion 211.

The pressure relief mechanism 40 can be actuated to release gas within the housing 20 in a case where an internal pressure or temperature of the battery cell 6 reaches a threshold value. The connection layer 60 can be actuated in a case where the internal pressure or temperature of the battery cell 6 reaches a threshold value to disengage the protective member 50 from the wall portion 211.

The protective member 50 has a melting point of more than 500° C., and optionally the protective member 50 is a mica plate.

Although this application has been described with reference to some preferred embodiments, various modifications to this application and replacements of the components therein with equivalents can be made without departing from the scope of this application. In particular, the technical features mentioned in the embodiments may be combined in any manner provided that there is no structural conflict. The present application is not limited to the specific embodiments disclosed herein, but includes all technical solutions falling within the scope of the claims.

What is claimed is:

1. A battery cell, comprising:
   a housing comprising a wall portion, the wall portion having an outer surface and being provided with an accommodating recess recessed with respect to the outer surface;
   a pressure relief mechanism provided at the wall portion, the pressure relief mechanism being capable of being actuated to release gas within the housing in a case where an internal pressure or temperature of the battery cell reaches a threshold value;

a protective member having a melting point greater than or equal to 300° C., the protective member covering at least part of the pressure relief mechanism in a thickness direction of the wall portion, at least a part of the protective member being accommodated in the accommodating recess; and
   a connection layer through which the protective member is connected to the wall portion,
   wherein a stepped surface is provided on a side wall of the accommodating recess, and the connection layer is located between the stepped surface and the protective member to connect the protective member to the wall portion,
   the connection layer is provided at an outer peripheral region of a surface of the protective member facing the pressure relief mechanism, an avoidance space is formed between the protective member and the pressure relief mechanism, a communication flow path is provided between the protective member and the wall portion, one end of the communication flow path communicates with an outside, and the other end of the communication flow path communicates with the avoidance space, the communication flow path comprises a single groove, facing the pressure relief mechanism, provided in a surface of the protective member, in the thickness direction, the connecting layer is not overlapped with the groove to reduce risk of filling the connecting layer into the groove.

2. The battery cell according to claim 1, wherein the protective member is completely accommodated in the accommodating recess.

3. The battery cell according to claim 1, wherein
   a bottom wall of the accommodating recess is provided with a through hole, and the pressure relief mechanism is accommodated in the accommodating recess, is connected to the bottom wall, and covers the through hole; and
   the protective member and the pressure relief mechanism are provided at intervals in the thickness direction.

4. The battery cell according to claim 3, wherein there is no other component between the protective member and the pressure relief mechanism in the thickness direction.

5. The battery cell according to claim 3, wherein
   in the thickness direction, a minimum spacing between the protective member and the pressure relief mechanism is D, and a minimum thickness of the protective member is t, and
   D and t satisfy $t \times D \geq 0.01$ mm$^2$.

6. The battery cell according to claim 5, wherein t is 0.05 mm-0.4 mm.

7. The battery cell according to claim 6, wherein t is 0.08 mm-0.2 mm.

8. The battery cell according to claim 1, wherein the connection layer comprises an adhesive layer.

9. The battery cell according to claim 1, the protective member has a melting point greater or equal to 500° C.

10. The battery cell according to claim 1, wherein a material for the protective member comprises one of mica, rubber, ceramic, or polyimide.

11. The battery cell according to claim 1, wherein a material of the protective member comprises polyimide, and the protective member has a tensile strength of 100 MPa-350 MPa at 150° C.

12. The battery cell according to claim 1, further comprising an electrode assembly accommodated in the housing; and the thickness direction of the wall portion is parallel to a gravity direction, and the wall portion is located at a lower side of the electrode assembly in the gravity direction.

13. The battery cell according to claim 1, wherein the housing comprises a case which has an opening at an end and an end cap which is connected to the housing and covers the opening; and the case comprises the wall portion opposite to the end cap.

14. A battery, comprising a plurality of battery cells, each battery cell of the plurality of battery cells comprising:

a housing comprising a wall portion, the wall portion having an outer surface and being provided with an accommodating recess recessed with respect to the outer surface;

a pressure relief mechanism provided at the wall portion, the pressure relief mechanism being capable of being actuated to release gas within the housing in a case where an internal pressure or temperature of the battery cell reaches a threshold value;

a protective member having a melting point greater than or equal to 300° C., the protective member covering at least part of the pressure relief mechanism in a thickness direction of the wall portion, at least a part of the protective member being accommodated in the accommodating recess; and a connection layer through which the protective member is connected to the wall portion, wherein a stepped surface is provided on a side wall of the accommodating recess, and the connection layer is located between the stepped surface and the protective member to connect the protective member to the wall portion, the connection layer is provided at an outer peripheral region of a surface of the protective member facing the pressure relief mechanism, an avoidance space is formed between the protective member and the pressure relief mechanism, a communication flow path is provided between the protective member and the wall portion, one end of the communication flow path communicates with an outside, and the other end of the communication flow path communicates with the avoidance space, the communication flow path comprises a single groove, facing the pressure relief mechanism, provided in a surface of the protective member, in the thickness direction, the connecting layer is not overlapped with the groove to reduce risk of filling the connecting layer into the groove.

15. The battery according to claim 14, further comprising a box within which the plurality of battery cells are accommodated;

the box comprising a first box wall, the wall portion of each of the plurality of battery cells being provided at an end of the housing of said battery cell facing the first box wall;

an inner side of the first box wall being provided with at least one channel; and a projection of the pressure relief mechanism of said battery cell being located within a projection of the at least one channel in the thickness direction; and in the thickness direction, the protective member of said battery cell being located between the at least one channel and the pressure relief mechanism of said battery cell.

16. The battery cell according to claim 15, wherein in the thickness direction, a projection of the protective member of each of the plurality of battery cells is located within a projection of the at least one channel.

17. The battery cell according to claim 16, wherein a size of the at least one channel is larger than that of the protective member of each of the plurality of battery cells in any direction perpendicular to the thickness direction.

18. An electric device, comprising the battery according to claim 14, the battery being used to provide electric energy.

* * * * *